United States Patent [19]

Atchley

[11] 3,734,063
[45] May 22, 1973

[54] DEMAND DELIVERY WATERING VALVE FOR ANIMALS

[76] Inventor: Frank W. Atchley, 461 Walnut St., Napa, Calif. 94558

[22] Filed: Aug. 3, 1971

[21] Appl. No.: 119,103

[52] U.S. Cl. ............................................... 119/72.5
[51] Int. Cl. ............................................. A01k 07/00
[58] Field of Search ............................... 119/72.5, 75

[56] References Cited

UNITED STATES PATENTS

| | | | |
|---|---|---|---|
| 3,289,635 | 12/1966 | Eagles | 119/72.5 |
| 3,646,955 | 3/1972 | Olde | 119/75 X |
| 2,939,424 | 6/1960 | Frederiksen | 119/72.5 |
| 3,613,642 | 10/1971 | Restall et al. | 119/72.5 |

*Primary Examiner*—Hugh R. Chamblee
*Attorney*—James R. Cypher

[57] ABSTRACT

A valve device for self-service watering of animals that attaches to a water supply line and delivers water through a pivotable, hollow control member directly into the animal's mouth.

14 Claims, 3 Drawing Figures

PATENTED MAY 22 1973
3,734,063
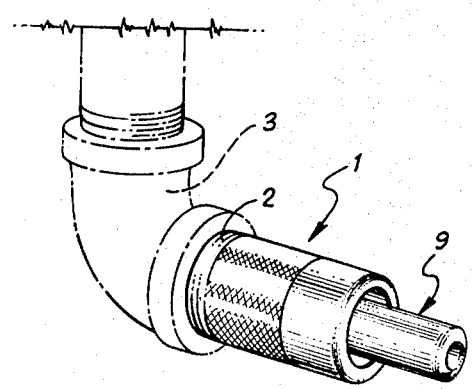
FIG_1
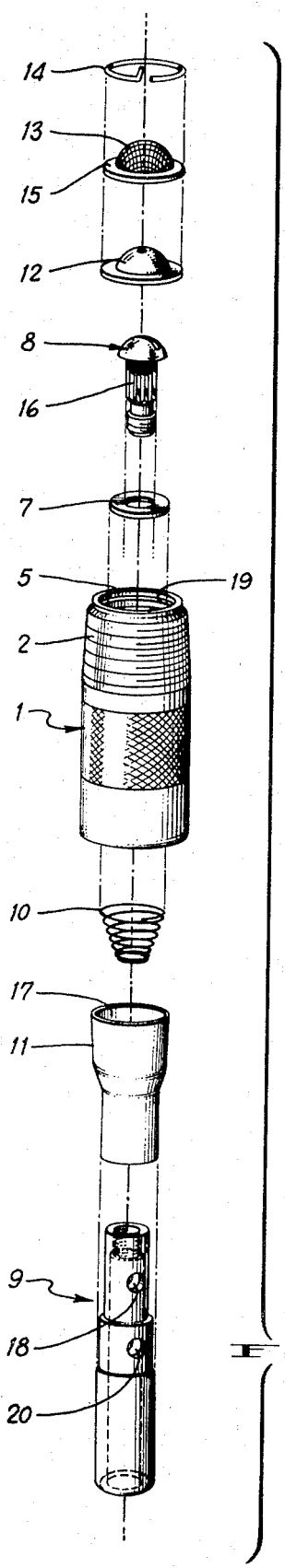
FIG_2
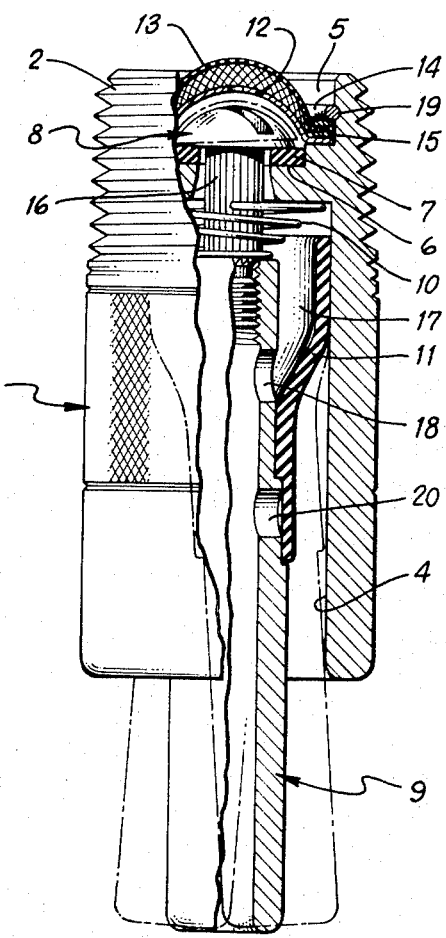
FIG_3
INVENTOR.
Frank W. Atchley

DEMAND DELIVERY WATERING VALVE FOR ANIMALS

BACKGROUND OF THE INVENTION

Prior art in the field of demand delivery watering valves for animals discloses numerous contrivances for animals that drink with a lapping action as dogs, cats, and rodents: e.g., Fredericksen 2939424, and others. However, nothing fully suitabls has yet been provided for animals that drink under a suction intake, as pigs, sheep, and primates. A satisfactory demand delivery valve for animals that drink with a suction intake must be enclosable within the animal's mouth—as a nipple—must be simple and easy to actuate, must have a regulatable water flow, and must provide assured reliable service.

SUMMARY

The essence of the invention is a compact cylindrical valve device that attaches directly to a water supply line and delivers water, on demand, directly into the animal's mouth through a hollow control device. The invention provides a removeable means for regulating the water flow and for maintaining assured trouble-free operation. The invention includes a provision to attract the animals and avoid the training problem.

BRIEF DESCRIPTION OF THE DRAWING

FIG. 1 is a perspective view of the valve device as it would appear installed in a pipeline in practice.

FIG. 2 is an exploded perspective view of the component parts of the valve device shown in FIG. 1.

FIG. 3 is a fragmentary cutaway longitudinal view of the valve device showing the assembled positioning of the component parts illustrated in FIG. 2.

DESCRIPTION OF THE PREFERRED EMBODIMENT:

FIG. 1 illustrates how the preferred embodiment of the valve device threads directly into a standard ell pipe fitting in a horizontal position. Other positions and angles of installation from horizontal to vertical are equally suitable.

FIGS. 2 and 3 reveal that the preferred embodiment of the invention comprises an elongate cylindrical housing body 1 adapted for connection to a water supply line with a tapered male pipe thread 2 on an inlet end and a deep recessed cylindrical axial bore opening 4 on the opposite end. An integral portion of the housing body 1 projects radially inward near the threaded inlet end and forms a flat annular valve seat 6 adapted to receive a resilient, washer-like, flat annular valve seal 7.

As shown in FIGS. 2 and 3, the internal components of the invention include a threaded valve screw 8 having a fluted shank 16, a flat annular valve seal 7, an elongate hollow control device 9, a cone-shaped compression centering spring 10, a cylindrical flexible deflector boot 11 in sealing engagement with the hollow control device 9 and with the inner wall of the recessed bore 4, a dome-shaped orifice disc 12, a dome-shaped filter screen 13, and a circular spring retainer clip 14. The dome-shaped filter screen 13 is contained within a crimp ring 15 to prevent splaying of loose ends.

FIG. 3 further shows that the fluted shank 16 of valve screw 8 extends through the annular valve seal 7 and valve seat 6 and threadably connects to the hollow control device 9 in coaxial alignment with the housing body 1 and recessed bore 4. It is further shown that the underside of the head portion of valve screw 8 is urged onto the resilient annular valve seal 7 by the engaged compressed force of the cone-shaped centering spring 10, forming a fluid seal in mutual coaxial alignment. From inspection of this mutual arrangement, it is apparent that pivotal, pendulum-like deflection of the hollow control device 9 out of coaxial alignment with the housing body 1 rockably tilts the head portion of valve screw 8 up off the annular valve seal 7, creating an opening for fluid flow. The water flows through this opening, thence on through the annular valve seal 7 and valve seat 6 via the fluted indentations 16 in the shank portion of valve screw 8. The water then flows through the coiled centering spring 10 into a chamber 17 formed by the flexible deflector boot 11 thence into the hollow control device 9 through side port holes 18 thence out the open distal end of the control arm 9 directly into the animal's mouth.

Inspection of FIG. 3 reveals that the dome-shaped orifice disc 12 nests inside the dome-shaped filter screen 13 and abuts against the inward projecting housing body 1 which forms the valve seat 6. Both the orifice disc 12 and filter screen 13 are removeably detained inside the housing body 1 by engagement of the circular retention ring 14 with a hemispherical annular groove 19 cut into the side wall of inlet bore 5. It can be seen that different-size, interchangeable domed orifice discs 12 provide means for selectably limiting the water flow for different animals and for compensation of pressure differences at various water supply sources. As is apparent, the filter screen 13 prevents malfunction of the described valving mechanism by preventing any plugging of the orifice opening or entrapment of sediment, scale, rust flakes, etc. under the valve screw head 8. Additional safeguard from malfunction is provided with pressure relief ports 20 in the hollow control arm to bypass the fluid flow in event of blockage of the distal end opening of the hollow control device 9. These pressure relief holes 20 are normally covered by a weakened portion of the cylindrical flexible deflector boot 11.

Inspection of FIG. 3 also discloses that the invention offers other safeguards from accidental malfunction. It utilizes compressive spring force coupled with fluid pressure on the head portion of valve screw 8 to maintain fluid seal. It employs a centering spring 10 coupled with elastomer resilience of the deflector boot 11 to return the control device 9 to a centered coaxial position and automatically close off the fluid flow. The hollow control device 9 protrudes substantially beyond the housing body 1, as a nipple, for delivery of water directly into the animal'mouth. It is easily actuated by the animal through pivotal, pendulum-like movement in any direction. Excessive pivotal movement of the control device 9 is prevented by the surrounding skirt-like extension of the housing body which serves as a stop. The length of the hollow control device 9, in relation to the diameter of the valve screw head 8, provides powerful lever advantage for safe, easy actuation by the animals. The hollow control device remains filled with entrapped water during periods of nonuse. This water is exposed to the atmosphere at the outer distal end of the control device and serves to attract the animals by smell and thereby avoid any training problem.

This foregoing description, in conjunction with the drawings, defines the means, adaptions, and positioning of various elements which together comprise the preferred embodiment of the present invention. As intended, the invention provides an easily operated, functional, demand delivery watering valve that serves water through a hollow control device directly into the animal's mouth. It has adjustable water flow, can be used under a wide range of operating pressures, and is equipped with safeguards to provide assured reliable service. It thus constitutes a new, useful, novel advance in the art of demand delivery animal watering devices.

From inspection of the drawings and the covering detailed specification, it is apparent that modifications in the construction, means, and positioning of the various elements which comprise the preferred embodiment of the present invention can be made without departing from the spirit of the invention. It is intended that all such modifications are included in the following claims.

I claim:

1. A demand delivery animal watering device comprising:
   a. a housing adapted for connection to a water supply;
   b. internal valving means mounted within said housing including a hollow elongated cylinder animal actuated control device extending beyond said housing and mounted for pivotal movement through which the water flows directly into the animal's mouth;
   c. said control device being mounted coaxially within and spaced from an inner wall of said housing, the distal end of said housing providing a stop limit for said control device;
   d. means for automatically closing the internal valving means;
   e. a resilient cylindrical member mounted for sealing engagement with said control device; and
   f. said control device having a passage through the wall thereof in the area surrounded by said resilient cylinder.

2. A device as described in claim 1 comprising:
   a. said resilient cylindrical member being mounted for sealing engagement with the inner wall of said housing; and
   b. said control member being formed with a second opening for receiving fluid diverted thereto by said resilient member.

3. A device as described in claim 2 comprising:
   a. a centering spring coaxially mounted with said control device for engaging said housing and said control device for returning said control device to a position coaxial with said housing for closing said valving means.

4. A device as described in claim 2 comprising:
   a. said resilient cylinder having a weakened section covering said first opening providing flow therethrough upon closing of the distal opening in said control device.

5. A device as described in claim 4 comprising:
   a. said valving means including a head rockably mounted on an annular valve seat.
   b. a stem threadably connected to said control device and integrally connected to said head, said stem being fluted to permit fluid flow upon rocking of said head upon said valve seat.

6. A demand delivery animal watering device comprising:
   a. a housing adapted for connection to a water supply and having a water inlet chamber and a discharge chamber with an opening providing communication between said chambers;
   b. a resilient valve seat member mounted on the inlet chamber side of said opening;
   c. an elongated control member having a head disposed in said inlet chamber having a first position in sealing engagement with said resilient valve seat, a stem extending through said opening and having a cross section less than the cross section of said opening, said control member having a distal end extending beyond said discharge chamber adapted for lateral rocking movement by an animal to a second position wherein said head is tipped to a nonsealing position permitting flow through said opening;
   d. a resilient member dimensioned for sealing engagement with the inner wall of said second chamber and dimensioned for normal sealing engagement with said control member thereby forming an expandable inner chamber;
   e. said control member being formed with a passage communicating between said inner chamber and said second chamber; and
   f. means urging said elongated member to said first position.

7. A demand delivery device as described in claim 6 comprising:
   a. said resilient member is constructed at the portion which normally seals with said control member so as to unseal and permit passage of water between said inner chamber and said second chamber when said passage in said control member is blocked and will not permit adequate water flow.

8. A demand delivery device as described in claim 6 comprising:
   a. said means urging said elongated member to said first position consists of constructing said resilient member in a concentric manner so that it urges said control member to a central position.

9. A demand delivery device as described in claim 6 comprising:
   a. said means urging said elongated member to said first position consists of a spring mounted in said second chamber engaging the inner wall of said chamber and said elongated member.

10. A demand delivery device as described in claim 6 comprising:
    a. a dome shaped filter mounted in said inlet chamber and covering said head of said control member so that all flow passes through said filter.

11. A demand delivery device as described in claim 10 comprising:
    a. an orifice member removably mounted between said filter and said head of said control member and having an orifice opening selectively dimensioned to control the amount of flow through said device.

12. A demand delivery device as described in claim 6 comprising:
    a. said passage in said control member continues from said inner chamber to the distal end of said control member.

13. A demand delivery device as described in claim 6 comprising:
  a. said resilient valve seat member having a relatively constant thickness and providing a planar surface for seating contact with said control member head.

14. A demand delivery device as described in claim 6 comprising:
  a. said opening between said inlet chamber and said second chamber being located relatively near said end adapted for connection to said pressure source providing a long lever arm for said control member which pivots about the head on said valve seat.

* * * * *